Patented Aug. 17, 1926.

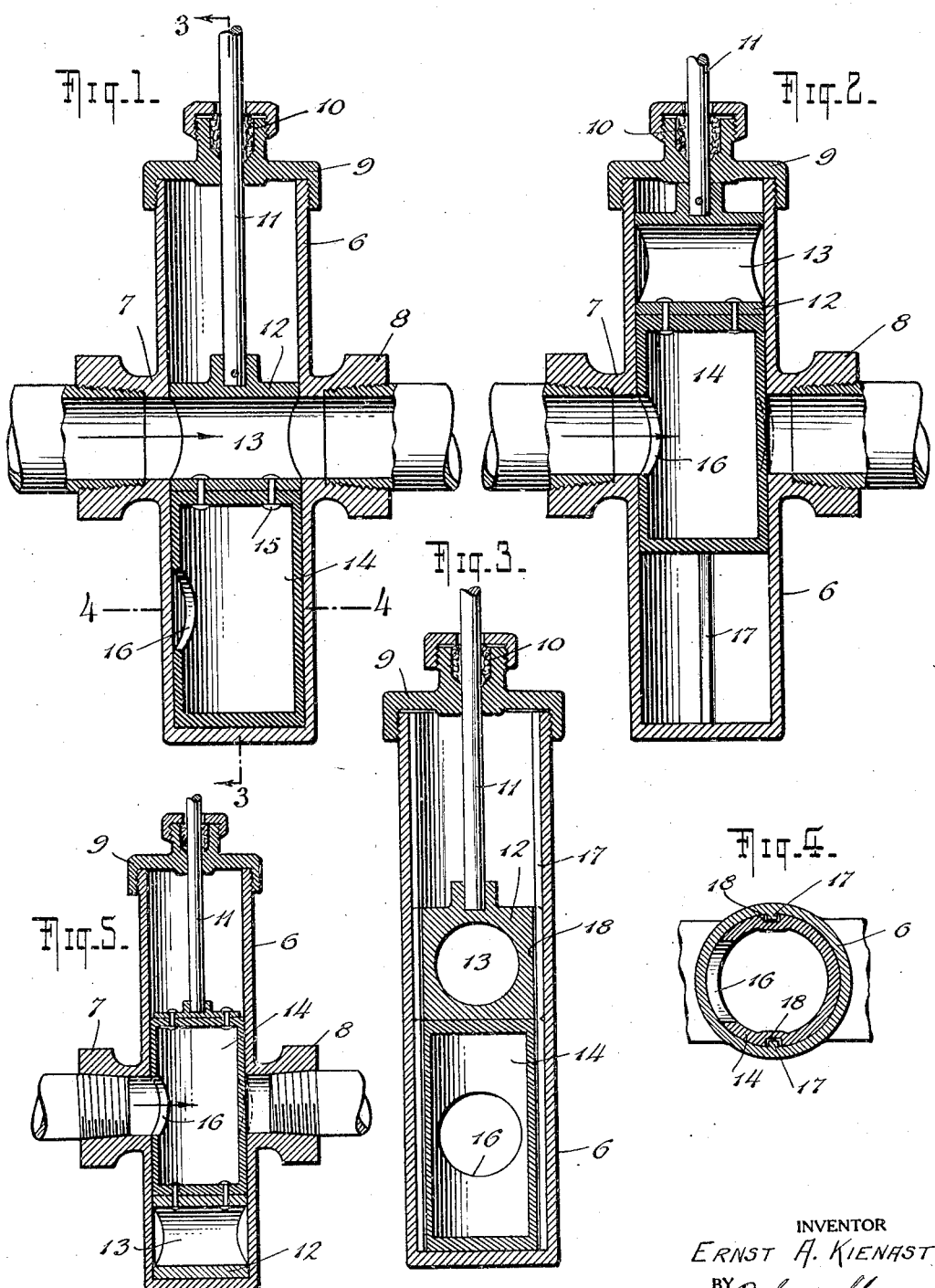

1,596,049

UNITED STATES PATENT OFFICE.

ERNST A. KIENAST, OF LOS ANGELES, CALIFORNIA.

VALVE.

Application filed October 24, 1924. Serial No. 745,699.

This invention relates to improvements in valves, and has particular reference to a valve employed in irrigation systems such as disclosed in my co-pending application, Serial No. 745,700, filed Oct. 24, 1924.

An object of the invention is to provide an improved valve simple in construction, effective in operation, and durable in use, having a piston or plunger so constructed that when the valve is in closing position the pressure of a fluid against a part of the piston will cause the latter to effectively close the outlet port of the valve casing.

The above and other objects will appear more clearly from the following detailed description, when taken in connection with the accompanying drawing, which illustrates a preferred embodiment of the inventive idea.

In the drawing—

Figure 1 is a vertical longitudinal section through one form of the valve showing the same in open position;

Figure 2 is a similar view showing the valve in closing position;

Figure 3 is a section on the line 3—3 of Figure 1;

Figure 4 is a section on the line 4—4 of Figure 1; and

Figure 5 is a view similar to Figure 1 showing a slightly different form of the valve.

Although the valve of the present invention is particularly designed for use in connection with an irrigation system such as disclosed in the above mentioned application, or for use in any form of water distribution system, it is to be expressly understood that the valve is in no way restricted to such uses, but may be employed for other purposes with equal facility and without departing from the spirit or scope of the invention.

The valve is shown in its preferred form as consisting of the casing or housing 6 of cylindrical formation having oppositely disposed inlet and outlet ports 7 and 8 formed intermediate the ends thereof. The housing is preferably provided at one end with a head formed integral with said housing, and provided at its other end with a removable cover 9 formed with a packing gland 10 through which the valve rod 11 extends into the casing.

The piston or plunger, which includes the essential features of the invention, comprises a head 12 to which is secured one end of the rod 11, as shown in Figures 1 to 3 inclusive. The head 12 is made of metal or any other suitable material and provided with a transverse opening 13 therethrough designed to register with the inlet and outlet ports 8 when the valve is in open position, as shown in Figure 1, so as to permit of the passage of a fluid through the valve.

The piston or plunger further includes the hollow flexible member 14 made of rubbber or other suitable flexible material, and comprises a cylindrical body having closed heads formed integral therewith. The piston is shaped to conform to the interior of the valve casing, one of the heads being secured by rivets or other suitable fasteners 15 to the head 12 so that said head and member 14 will be reciprocated together by the movements of the valve rod 11. Intermediate the ends of the member 14 the same is provided in one wall thereof with an opening 16 of substantially the same size as the inlet port 7 and capable of registering with said port when the valve is moved to closing position, as shown in Figure 2. When in this position the fluid enters the interior of the member 14 and the pressure of said fluid against the wall of the member 14 opposite its opening 16 is sufficient to cause a portion of said wall, due to its flexibility, to enter or project into the outlet port 8, as shown in dotted lines in Figure 2, and thus form an effective seal for said port which will prevent the passage of the fluid therethrough. Said pressure is also utilized to cause the remaining portion of the wall of the member 14 to frictionally engage the interior of the casing 6 and thus assist in maintaining the outlet port closed.

In order that the piston may be guided in its reciprocating movement in the casing 6 the latter is provided at oppositely disposed points with longitudinally extending ribs engageable in similarly formed grooves 18 in the head 12 and member 14.

In the form of the invention shown in Figure 5 the relative positions of the head 12 and member 14 are reversed, the latter member being, in this instance, connected directly to the valve rod 11, while the head 12 is secured to the lower end of the member 14. With this construction the piston may be moved downwardly in its casing to close the outlet port as distinguished from the upward movement of the piston to the position shown in Figure 2 to accomplish this purpose.

By means of such construction a valve is provided having a discharge head and a flexible member each formed independently of the other, and secured together in a simple and effective manner, avoiding any interlocking connection between the wall of said flexible member and a head or other part of the valve, and the disadvantages and objections arising from such a construction.

What is claimed is:

In a valve, a casing having an open end, a closed end, inlet and outlet ports intermediate its ends, and a cylindrical bore extending the length thereof, a piston head movable in said casing and provided with a transverse opening capable of being aligned with said ports, a hollow cylindrical and flexible member fitted in said bore and having closed ends one of which is secured to said piston head for movement therewith, the flexible cylindrical wall of said hollow member having an opening movable into alignment with said inlet opening to permit liquid to enter and fill said member whereby the wall thereof at a point diametrically opposite said opening will be forced, by the pressure of the liquid in the member, to project into the outlet port in said casing, and means for moving said piston head and hollow member longitudinally in said bore.

In testimony whereof I have affixed my signature.

ERNST A. KIENAST.